Dec. 1, 1959  L. GULFELT  2,915,291
CROSS SHAFT ROTARY DRILL BIT
Filed Jan. 18, 1956

INVENTOR.
LARS GULFELT
BY
Barnes Kisselle Laughlin & Raisch
ATTORNEYS.

United States Patent Office 2,915,291
Patented Dec. 1, 1959

2,915,291

CROSS SHAFT ROTARY DRILL BIT

Lars Gulfelt, Detroit, Mich.

Application January 18, 1956, Serial No. 559,834

12 Claims. (Cl. 255—328)

This invention relates to a rotary drill for drilling into the earth, and it has to do particularly with the head and cutter arrangement which is often referred to as a bit.

One object of the invention is to provide a drilling head or bit of improved construction which will minimize breakage while in use. Many bits now in use have rotating cutters facing inwardly toward each other and when a hard piece of material, such as granite, gets in between the cutters or between the teeth thereof they can no longer rotate. When this occurs the drilling device must be pulled out and reconditioned or replaced and this is a time consuming procedure especially in the drilling of deep oil wells. In accordance with the present invention, the rotary cutters on the head face outwardly.

Another object of the invention is to provide a drilling device with rotary cutters thereon facing outwardly, that is, facing away from each other, wherein the cutters are so arranged that they cut into the material completely across the diameter of the circle described by the rotating bit, to the end that no additional small pilot cutter is needed at the center of the circle thus described. Rotary drills which require a centrally positioned, and necessarily relatively small cutting device, at the center of the described circle which is bored into the earth, can cut no faster than the cut provided by the small center cutter. If the small center cutter becomes defective the drill head cannot advance into the earth even though the larger rotating cutters are in perfectly good shape. The rotary drilling device of this invention eliminates the necessity of an auxiliary drilling device at the center thereof.

The drawings show a drilling device constructed in accordance with the invention.

The head or body of the device is generally illustrated at 1 provided with a screw threaded portion 2 for receiving the drill pipe 3. The body is hollow thus providing a cavity 5 through which water may pass to flush out the sediment.

Figure 1:
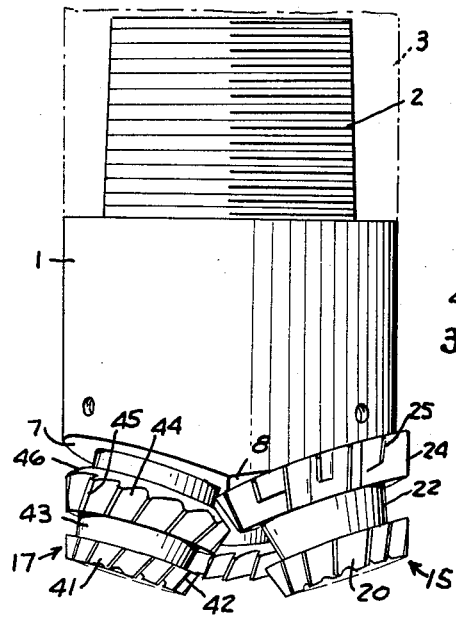
Fig. 1 is a side elevational view illustrating the body and the cutters thereon.
Figure 2:
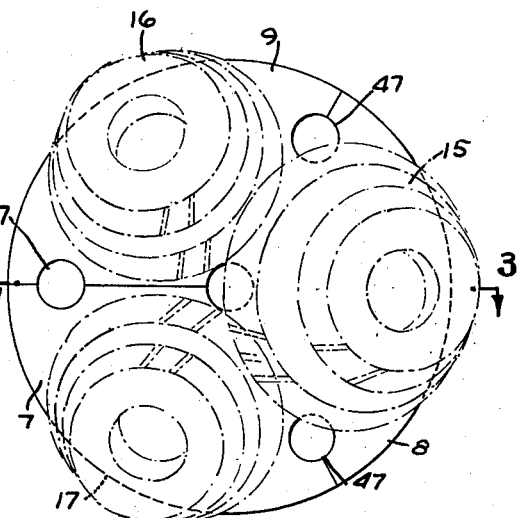
Fig. 2 is a view looking at the underside of the rotary drilling device.
Figure 3:
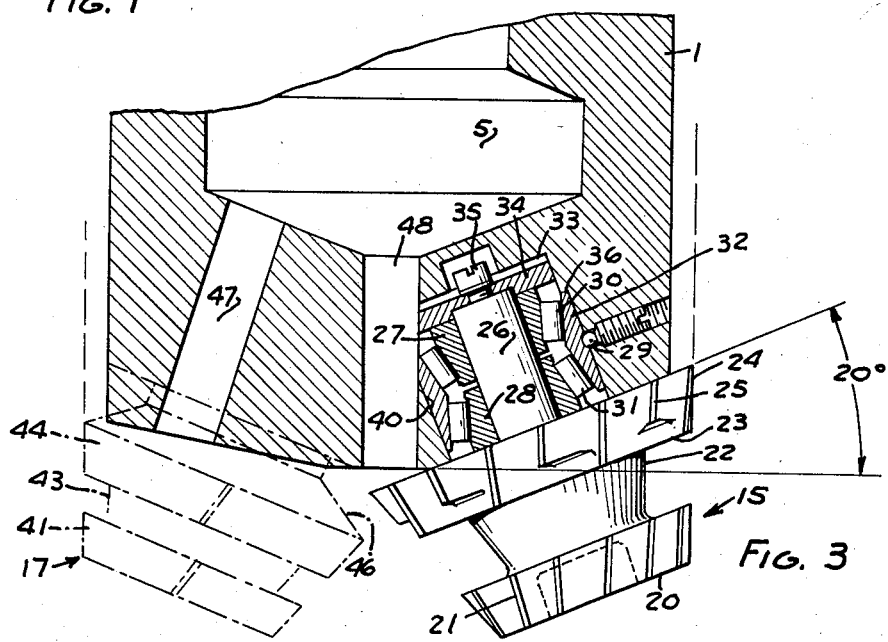
Fig. 3 is a somewhat enlarged sectional view taken substantially on line 3—3 of Fig. 2 with one of the rotary cutters displaced from its normal position and shown in broken lines.

The lower end of the body is formed with three facets 7, 8 and 9 for the three rotary cutters. The three rotary cutters are preferably uniformly spaced on axes 120° apart and they are indicated at 15, 16 and 17. The cutter 15 as illustrated in Fig. 3, is formed with a terminal portion 20 with cutter teeth 21 thereon and rearwardly of the terminal piece is a relieved portion 22 which extends to a base portion 23. The base portion is preferably provided with cutter teeth 24 which extend completely across the face of the base portion and alternate shorter cutter teeth 25.

This cutter is mounted in the head so that it can freely rotate on its own axis and for this purpose it has an extending stud or axle member 26 mounted in an anti-friction bearing. The bearing illustrated is of the double roller type having an inner race 27 and a second inner race 28 with two annular rows of rollers 30 and 31. The outer race is shown at 32 which fits snugly in recess 33 in the body. The end of the stud 26 is provided with a plate 34 secured thereto by a cap screw 35 and the outer race 32 seats on an internal shoulder 36. The bearing is held in the head in a suitable manner as, for example, by a holding screw acting on a ball 29 to seat the ball in a recess or groove 40 in the outer race. Thus the cutter is freely rotatable with upward thrust as Fig. 3 is viewed taken by the shoulder 36. This thrust is communicated through the annulus of rollers 31. Forces which may tend to pull the cutter out of the head are resisted by the plate 34 with the forces transmitted through the annulus of rollers 30 and the ball 29.

The two cutters 16 and 17 may be identical with each other but are different from the cutter 15. The cutter 17 has terminal portion 41 with teeth 42 thereon, a relieved intermediate portion 43 and a base portion 44 with teeth 45. The cutter 17 is mounted in the head in the same manner as cutter 15 and thus the bearing structure need not be redescribed. The cutter 16, being identical with cutter 17, needs no redundant description. Cutter 16 is mounted the same as cutter 15.

The head is provided with passages or ports 47 for the passage of water therethrough from the cavity 5 and conveniently there is a central port or passage 48. The usual water or drilling mud flows through the passage 5 and through the several ports for removal of the slush.

The cutter tools are of conical form and are so shaped and positioned that the cutter teeth, when in radial outward position, are contiguous with or are in line with the inside diameter of the hole W which is being formed. The cutter 15 has a larger base diameter and a cutting surface of greater axial extent than the cutters 16 and 17. This is clearly illustrated in Fig. 3 where the cutter 17 is displaced to a position diametrically opposite the cutter 15. Thus the base 23 of the cutter 15 overlaps the base of the cutter 17. Moreover, the base of the cutter 17, as well as the cutter 16, is relieved as at 46 so that the bases of the cutters overlap but do not interfere with each other. Furthermore, the base of the cutter 15 extends inwardly beyond the axial center of the tool as clearly shown in Fig. 3.

Figure 4:
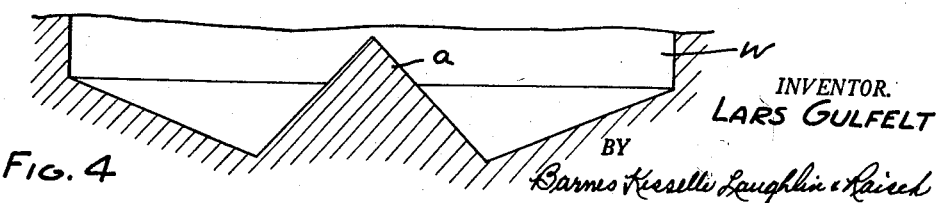
Fig. 4 is a view illustrating the pattern of the surface at the bottom of a hole.

In use the tool is rotated in the usual manner and the cutters rotate on their axes and in the action of drilling into the earth a circular hole is formed. Due to the overlap of the cutters and due to the fact that the base of the cutter 15 extends beyond the center line of the tool, the three cutters cut material completely across the diameter of the hole being formed. Thus there is no requirement or need for an auxiliary center cutter. As the device is operated, the surface at the bottom of the hole has a configuration or pattern as shown in Fig. 4. This configuration includes a central conical form of earth or rock as indicated at $a$ which lies centrally and between the cutters. This aids in the guiding of the tool, or perhaps it is better to state that the tool by forming such configuration tends to guide itself into the earth along a reasonably straight line.

Due to the fact that the cutters face outwardly the chances of hard pieces of material getting in between the cutters and the teeth thereof to jam the same and prevent their rotating is greatly minimized. Any particles or parts which tend to get between the cutters to jam them are more or less urged outwardly. Insofar as the invention is concerned the angularity of the cutters relative to the center line of the head may vary. However, tests have shown that an angle of about 20° is highly satisfactory. Furthermore, the particular shape of the cutters, with reference to features such as the relieved parts 22 and 43 and the particular formation of the teeth and the material of which the cutters and teeth are formed are subject to variation. The material used may be selected to meet varying earth conditions as, for example, by the use of wear-resisting alloy metals.

I claim:

1. A rotary drilling device for drilling into the earth comprising, a head adapted to be rotated, a plurality of frusto-conical shaped rotary cutters on the lower end of the head each on an axis which diverges downwardly from the axis of the head, the angles of the axes of the rotary cutters and the frusto-conical shape of the cutters being such that upon rotation of the head all cutters describe a circle at their outermost edges of a diameter of substantially the diameter of said head, one of said cutters having a cutting surface of greater axial extent than the others and having a diameter at its base greater than the others and the base diameter thereof extending inwardly at least substantially to the axis of the head, the outer effective cutting surface of each cutter being in a substantially vertical plane and the effective inner cutting surfaces of each cutter cooperating to form a cone.

2. A rotary drilling device for drilling into the earth comprising, a head adapted to be rotated, a plurality of frusto-conical shaped rotary cutters on the lower end of the head each on an axis which diverges downwardly from the axis of the head, the angles of the axes of the rotary cutters and the frusto-conical shape of the cutters being such that upon rotation of the head all cutters describe a circle at their outermost edges of the same diameter, one of said cutters having a cutting surface of greater axial extent than the others and having a diameter at its base greater than the others and the base diameter thereof extending inwardly beyond the axis of the head, the outer effective cutting surface of each cutter being in a substantially vertical plane and the effective inner cutting surfaces of each cutter cooperating to form a cone.

3. A rotary drilling device for drilling into the earth comprising, a head adapted to be rotated substantially about an axis, a plurality of rotary cutters arranged in an annular array at the lower end of the head, each on an axis which diverges downwardly from the axis of the head, one rotary cutter having a cutting surface of an axial extent and a base diameter such that at its base diameter it extends from a location outwardly of the head to a location beyond the axis of the head, the other cutters having lesser axial extent and lesser base diameter, whereby they are located entirely on one side of the axis of the head to provide clearance between the cutters, the outer effective cutting surface of each cutter being in a substantially vertical plane and the effective inner cutting surfaces of each cutter cooperating to form a cone.

4. A rotary drilling device for drilling into the earth comprising, a head adapted to be rotated substantially on an axis, a plurality of rotary cutters at the lower end of the head each on an axis which diverges downwardly from the axis of the head, said rotary cutters being frusto-conical in shape and having cutting teeth on their peripheral portions, the cutters being arranged so that upon rotation of the head they all describe a maximum circle of a diameter greater than the head, one cutter having a diameter at its base such that the cutter overlaps the axis of the head, the remaining cutters having a lesser diameter at their bases whereby each other cutter is located wholly on one side of the axis of the head, the outer effective cutting surface of each cutter being in a substantially vertical plane and the effective inner cutting surfaces of each cutter cooperating to form a cone.

5. The rotary drilling device as recited in claim 4 characterized in that there are three rotary cutters spaced on axes substantially 120° apart.

6. A rotary drilling device for drilling into the earth comprising, a head adapted to be rotated substantially on an axis, a plurality of rotary cutters at the lower end of the head each on an axis which diverges downwardly from the axis of the head at an angle approximately 20°, said rotary cutters being frusto-conical in shape and having cutting teeth on their peripheral portions, the cutters being arranged so that upon rotation of the head they all describe a maximum circle of a diameter greater than the head, one cutter having a diameter at its base such that the cutter overlaps the axis of the head, the remaining cutters having a lesser diameter at their bases whereby each other cutter is located wholly on one side of the axis of the head, the outer effective cutting surface of each cutter being in a substantially vertical plane.

7. A rotary drilling device for drilling into the earth comprising, a head to be rotated, a plurality of rotary cutters rotatably mounted at the lower end of the head, each cutter disposed on an axis which, at the lower end of the head, is spaced from the axis of the head, the axis of each cutter being so spaced from the axis of the head and the cutters being so arranged and of such size that upon rotation of the head they all describe a maximum circle of a diameter approximating the diameter of the head, one of said rotary cutters having a diameter at its base adjacent the head greater than any diameter of the others and a portion of said one rotary cutter extending inwardly at least to the axis of the head, portions of said cutters cooperating when the head is rotated to form a convex cone in the center of the area being drilled, portions of said cutters forming said convex cone also being effective to form the wall of the hole being drilled.

8. A rotary drilling device for drilling into the earth comprising, a head to be rotated, a plurality of rotary cutters rotatably mounted at the lower end of the head, each cutter disposed on an axis which, at the lower end of the head, is spaced from the axis of the head, the axis of each cutter being so spaced from the axis of the head and the cutters being so arranged and of such size that upon rotation of the head they all describe a maximum circle of a diameter approximating the diameter of the head, one of said rotary cutters having a diameter at its base adjacent the head greater than any diameter of the others and a portion of said one rotary cutter extending inwardly at least to the axis of the head, a portion of each cutter cooperating when the head is rotated to form a convex cone in the center of the area being drilled, an outer effective cutting surface of said portion of each cutter being in a substantially vertical plane.

9. A rotary drilling device for drilling into the earth comprising, a head adapted to be rotated, a plurality of frusto-conical shaped rotary cutters on the lower end of the head each on an axis which diverges downwardly from the axis of the head, the angles of the axes of the rotary cutters and the frusto-conical shape of the cutters being such that upon rotation of the head all cutters describe a circle at their outermost edges of the same diameter and substantially the diameter of the head, a series of cutting teeth upon the conical periphery of each cutter, said teeth extending in a common conical surface on each cutter and lying in spaced zones axially thereof, one of said cutters having a cutting surface of greater axial extent than the others and having a diameter at its base greater than the others and the base diameter thereof extending inwardly at least substantially to the axis of the head, the outer effective cutting surface of each cutter being in a substantially vertical plane.

10. A rotary drilling device for drilling into the earth comprising, a head adapted to be rotated, a plurality of frusto-conical shaped rotary cutters on the lower end of the head each on an axis which diverges downwardly from the axis of the head, the angles of the axes of the rotary cutters and the frusto-conical shape of the cutters being such that upon rotation of the head all cutters describe a circle at their outermost edges of the substantially same diameter as the head, a series of cutting teeth upon the conical periphery of each cutter, said teeth extending in a common conical surface on each cutter and lying in spaced zones axially thereof, one of said cutters having a cutting surface of greater axial extent than the others and having a diameter at its base greater than the others and the base diameter thereof extending inwardly beyond the axis of the head, the outer effective cutting surface of each cutter being in a substantially vertical plane.

11. A rotary drilling device for drilling into the earth comprising, a head adapted to be rotated, three rotary cutters on the lower end of the head each on an axis which diverges downwardly from the axis of the head, whereby the cutters are outwardly facing, two of said cutters having an axial extent and a base diameter less than that of the third, and with the base diameter of each wholly on one side of the axis of the head, the third cutter having a cutting surface of such an axial extent and a base diameter that its maximum diameter overlaps the axis of the head, all of said cutters being provided with cutting teeth which circumscribe a conical surface upon the bottom of the hole being drilled and only said third cutter sweeping the apex portion of the conical surface, the outer effective cutting surface of each cutter being in a substantially vertical plane.

12. A rotary drilling device for drilling into the earth comprising, a head adapted to be rotated substantially about an axis, a plurality of rotary cutters arranged in an annular array at the lower end of the head, each on an axis which diverges downwardly from the axis of the head, one rotary cutter having a cutting surface of an axial extent and a base diameter such that at its base diameter it extends from a location outwardly of the head to a location beyond the axis of the head, the other to a location beyond the axis of the head, the other cutters having lesser axial extent and lesser base diameter, whereby they are located entirely on one side of the axis of the head to provide clearance between the cutters, said other cutters traversing a frustural conical surface at the bottom of the hole and said one cutter traversing the same surface and in addition the apex thereof whereby to remove progressively the earth formation constituting said cone, the outer effective cutting surface of each cutter being in a substantially vertical plane.

References Cited in the file of this patent
UNITED STATES PATENTS

| | | |
|---|---|---|
| 1,131,701 | Hughes | Mar. 16, 1915 |
| 1,812,475 | Gildersleeve | June 30, 1931 |
| 1,855,266 | Johnson | Nov. 1, 1932 |
| 2,104,820 | Scott | Jan. 11, 1938 |
| 2,463,932 | Zublin | Mar. 8, 1949 |
| 2,634,955 | Johnson | Apr. 14, 1953 |